Dec. 25, 1934.     M. MENNESSON     1,985,576
MEASURING APPARATUS
Filed April 9, 1930     2 Sheets-Sheet 1
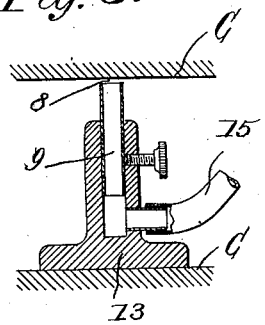
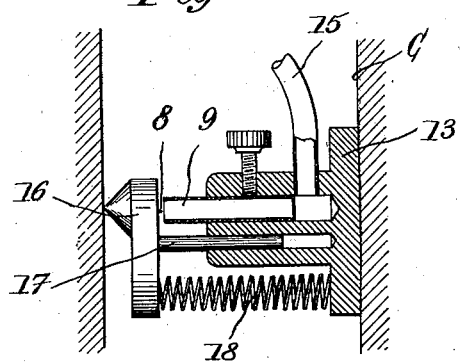
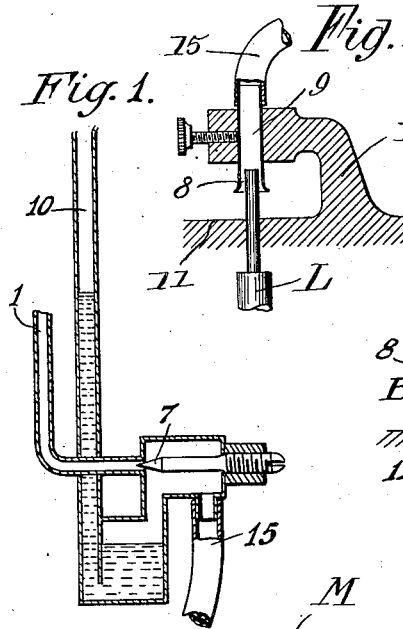
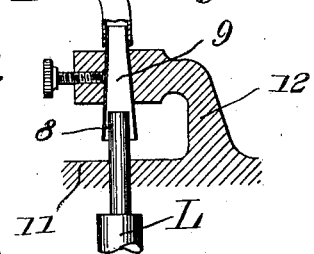
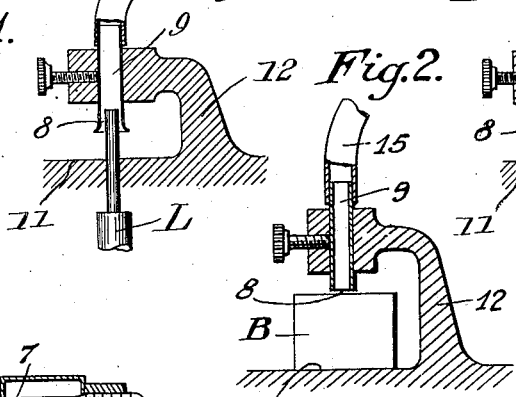
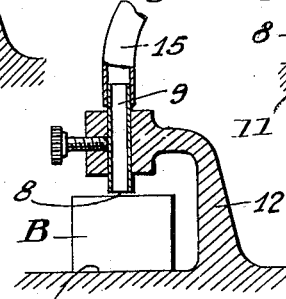
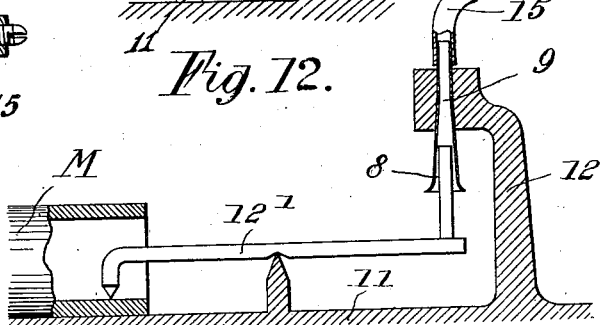
Inventor:
Marcel Mennesson,
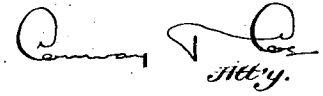
Att'y.

Dec. 25, 1934. M. MENNESSON 1,985,576
MEASURING APPARATUS
Filed April 9, 1930    2 Sheets-Sheet 2
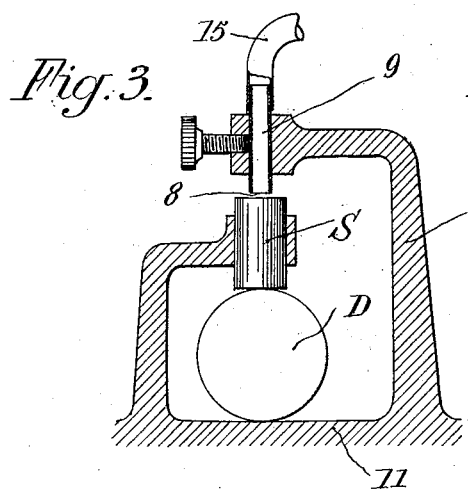
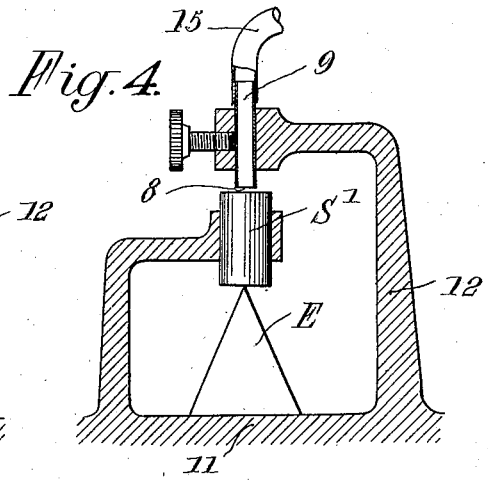
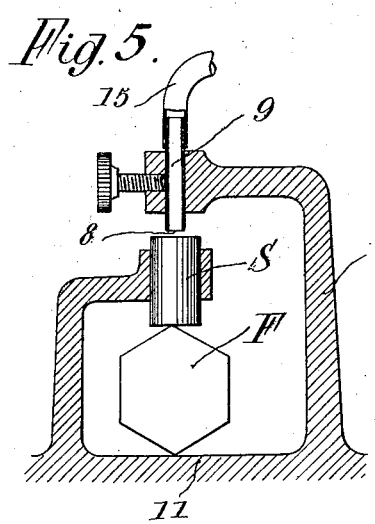
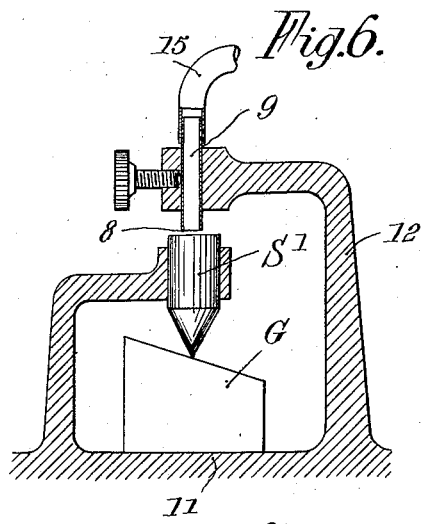
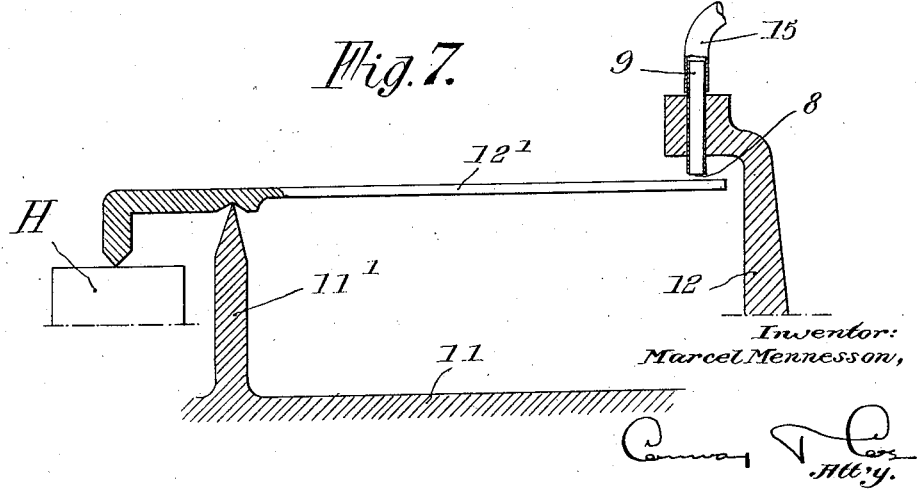
Inventor:
Marcel Mennesson, Patented Dec. 25, 1934

1,985,576

UNITED STATES PATENT OFFICE 1,985,576

MEASURING APPARATUS

Marcel Mennesson, Neuilly-sur-Seine, France, assignor to the Société Anonyme de Construction de Materiel Automobile, S. A. C. M. A., Paris, France Application April 9, 1930, Serial No. 442,915
In Belgium May 21, 1929

2 Claims. (Cl. 33—174)

The present application is a continuation in part of the inventor's co-pending application Ser. No. 334,987, filed January 25, 1929 and relates to apparatus for measuring length and, more particularly, to apparatus for calibrating orifices or for measuring the distance between a pair of surfaces.

One of the objects of the invention is to provide means for measuring the diameter of an orifice or the thickness of an object to an accuracy of approximately 1/1000th of a millimeter without the use of calipers or similar instruments.

Another object is to provide means for rapidly and accurately calibrating orifices such as carbureter nozzles and the like so as to measure the exact amount of fluid which pass therethrough under operating conditions.

Further objects will appear in the course of the detailed description now to be given in connection with the accompanying drawings, in which:—

Fig. 1 shows a detail of a form of manometer adapted to be used with any of the devices represented in the drawings;

Figs. 2 to 7 show a form of device adapted for use in measuring the thickness of an object;

Figs. 8 and 9 represent the form of device illustrated in Fig. 2 applied to the measurement of the distance between a pair of parallel walls or of the internal diameter of a cylinder;

Figs. 10 and 11 illustrate the procedure employed for measuring the diameter of a solid shaft;

Fig. 12 is a modified form of structure for measuring shaft diameters applied to the measurement of a thickness.

The principle upon which the invention is based is the following:—If a gas under constant pressure is forced through a pair of orifices in series with one another, the gaseous pressure in the space between said orifices will be a function of the relative sections of the latter and the measurement of said gaseous pressure by means of a manometer or the like will indicate the diameter (or section) of one orifice relatively to the other.

Referring to Fig. 1 of the drawings there is shown a measuring assembly consisting of a constant pressure gas supply conduit 1 receiving air or the like from a source of constant pressure (not shown) a needle valve 7 controlling the flow of air from conduit 1 into a conduit 15, and a manometer 10 measuring the pressure in the conduit 15.

In the form of device shown in Fig. 2, nipple 9 is made in the form of a cylindrical tube and is supported over an article B, whose thickness is to be measured, by a supporting arm 12 mounted on a table 11. Manometer 10, connected to nipple 9 by flexible hose 15, will measure the thickness of the annular space 8 between block B and the end of the nipple and indicate variations in thickness of any series of blocks relative to block B taken as a standard.

Figs. 3 to 6 show how the device shown in Fig. 2 may be used to measure the thickness (or other dimension) of a body whose top surface does not lie in a horizontal plane, in which case nipple 9, if applied directly, would no longer leave an interval 8 of constant height at all points along its circumference. If the body to be measured is cylindrical, conical, or polygonal, a cylindrical solid of known length, S, is applied thereto in the manner shown in Figs. 3, 4 and 5 and the thickness of annular space 8 measured as already described. The top of solid S being horizontal, space 8 is perfectly annular and dimensions D, E or F may be calculated by an easy arithmetical operation.

If the top surface of the body to be measured is inclined in the manner shown in Fig. 6 (body G) so as to prevent convenient use of an intermediate solid of the type S, having a plane, horizontal bottom face, the latter is replaced by a solid $S^1$ having a conical or similarly shaped bottom portion, and a top surface similar to that of body S. The thickness of body G may then be measured at any portion thereof in a manner which is self-evident.

Fig. 7 shows the form of device represented in Figs. 2 to 6 applied to the measurement of an object H which, for any reason, cannot be moved under the measuring instrument. Here, a fulcrum $11^1$ supports a lever $12^1$, leaving an annular space 8 between nipple 9 and the latter to be measured. It will be noted that this form of the invention may be used to increase the accuracy thereof, the inequality in length of the lever arm multiplying the sensibility.

Fig. 8 shows nipple 9 supported on a machined base 13, the whole assembly being inserted into between parallel walls C, C so as to leave an annular space 8 whose "thickness", measured by manometer 10 (via tube 15), and added to the overall length of assembly 9, 13 gives an accurate measure of the distance between walls C, C.

If walls C, C are cylindrical (such as an engine cylinder) and it is desirable to provide a flat surface to face the end of nipple 9, base 13 may be fitted with a movable element 16 of the type illustrated in Fig. 9, i. e. having a flat surface facing nipple 9 and a pointed element facing wall C, a guide rod 17 and a spring 18 being provided to slidably extend element 16 towards wall C. Measurement of space 8 will here again suffice to give, indirectly, the cylinder's diameter.

Fig. 10 shows the manner in which the invention is applied to the measurment of the diameter of a shaft. Here, nipple 9 fits over the end of shaft L, and the manometer registers the section of the space between the nipple and the shaft. The inside diameter of the nipple being known, the manometer readings may be arranged to register directly the section or diameter of the shaft inserted into the former.

In the form of device represented in Fig. 11, nipple 9 is given a conical section, and support 11, 12 is arranged to be displaced vertically over the end of shaft L. By providing a suitable scale (not shown), the distance that cone 9 must be moved over shaft L to register any chosen reading of manometer 10 may be taken as an indication of the diameter of the shaft.

Fig. 12 combines certain features of the structures shown in Figs. 7 and 11, the lever principle being combined with the conical nipple-shaft assembly to measure the thickness of a cylindrical wall, the cylinder M being too small in diameter to permit insertion of the measuring device. Here again, the lever serves to amplify the thickness readings.

What I claim is:—

1. In a work measuring device of the class described, a fluid pressure system including a chamber having two orifices, a source of fluid under pressure, means connecting said source of fluid to one of said orifices, means interposed in said connecting means to regulate the flow of fluid therethrough, a pressure gauge connected to said chamber, a nozzle, a support, a solid of predetermined length movably mounted in said support in alignment with said nozzle, said solid being interposed between the end of the nozzle and the surface of the work, so that pressure fluid may issue from the nozzle between the end of the nozzle and the surface of the solid, a flexible conduit connecting the other orifice of said chamber to said nozzle, variation in the velocity with which the fluid issues through the nozzle being indicated by changes in the indication of said gauge, whereby variation in the distance between the end of the nozzle and the surface of the solid will be indicated.

2. In a work measuring device of the class described, a fluid pressure system including a chamber having two orifices, a source of fluid under pressure, means connecting said source of fluid to one of said orifices, means interposed in said connecting means to regulate the flow of fluid therethrough, a pressure gauge connected to said chamber, a nozzle, a support, a solid body slidably mounted on said support and having a portion thereof in line with said nozzle, a spring tending to force said solid body away from said support, said solid being interposed between the end of the nozzle and the surface of the work, so that pressure fluid may issue from the nozzle between the end of the nozzle and the surface of the solid, a flexible conduit connecting the other orifice of said chamber to said nozzle, variation in the velocity with which the fluid issues through the nozzle being indicated by changes in the indication of said gauge, whereby variation in the distance between the end of the nozzle and the surface of the solid will be indicated.

MARCEL MENNESSON.